United States Patent Office 3,407,199
Patented Oct. 22, 1968

3,407,199
TERTIARYAMINO ETHYL OR PROPYL PYRROL-2-YL KETONES
Irwin J. Pachter, Woodbury, N.Y., assignor to Endo Laboratories Inc., Garden City, N.Y.
No Drawing. Filed Jan. 18, 1966, Ser. No. 521,424
10 Claims. (Cl. 260—247.5)

ABSTRACT OF THE DISCLOSURE

Novel amino alkyl pyrrol-2-yl ketones and the addition salts thereof which are useful as tranquilizers, and processes for the preparation thereof are disclosed. The novel compounds may be prepared by one or two alternate routes. In one route the Grignard derivative of the appropriate pyrrole is reacted with a haloacylhalide, followed by reaction with the appropriate amine. In the second route the Grignard derivative of the appropriate pyrrole is reacted with an acylhalide followed by Mannich condensation with formaldehyde with appropriate amine.

---

This invention relates to, and has for its principal object the provision of novel aminoalkyl pyrrol-2-yl ketones (having the structural Formula A, hereinafter set forth); the acid addition salts thereof; and processes for the preparation thereof.

These products have valuable pharmacodynamic activity, to wit, central nervous system activity and, in particular, are useful as tranquilizers.

The structural formula of the aminoalkyl pyrrol-2-yl ketones is:

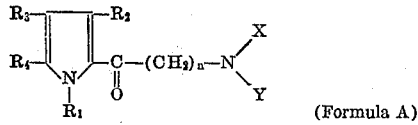

(Formula A)

wherein:

$R_1$ designates hydrogen a lower alkyl group having a maximum of 4 carbon atoms or benzyl;

$R_2$, $R_3$ and $R_4$ designate hydrogen, alkyl, alkenyl or cycloalkyl having a maximum of 8 carbon atoms, phenyl or benzyl;

$n$ is 2 or 3;

X and Y may be linked to constitute a heterocyclic ring having a maximum of 8 carbon atoms such as piperidino, (lower alkyl) piperidino, di(lower alkyl)piperidino, (lower alkoxy)piperidino, hydroxypiperidino, phenyl hydroxypiperidino, (lower acyloxy) piperidino, pyrrolidino, (lower alkoxy) pyrrolidino, hydroxypyrrolidino, morpholino, (lower alkyl) morpholino, thiamorpholino, (lower alkyl) thiamorpholino, di(lower alkyl) thiamorpholino, (lower alkoxy) thiamorpholino, piperazino, (lower alkyl) piperazino, di-alkyl (piperazino), (lower alkoxy) piperazino, phenylpiperazino, hydroxyalkyl-piperazino, lower acyloxy-lower alkyl piperazino, and carbamyloxy-lower alkyl piperazino.

The terms "lower acyl," "lower alkyl," and "lower alkoxy" designate both straight and branched chain radicals having a maximum of 5 carbon atoms.

Acids useful for preparing the acid addition salts (pharmaceutically acceptable) includes inorganic acids such as hydrochloric, hydrobromic, sulfuric, nitric, phosphoric and perchloric acids, as well as organic acids such as oxalic, tartaric, citric, acetic, succinic, maleic and ethane disulfonic acids.

The novel aminoalkyl products of this invention are derived from novel haloacyl intermediates. In special situations, products may also be derived by way of the Mannich reaction.

The haloacyl intermediates are prepared by reaction of haloacyl halides with Grignard derivatives of appropriate pyrroles.

In the final step of the synthesis, an organic base

wherein X and Y have the significance above set forth, is permitted to stand at room temperature with the haloacyl intermediate for from two to twenty-four hours. Alternately, the reactants may be heated in a suitable solvent such as a lower alcohol for ten minutes to four hours in order to complete the reaction.

Exemplary of a process for the preparation of compounds of Formula A in which $n$ is 3 is the following sequence:

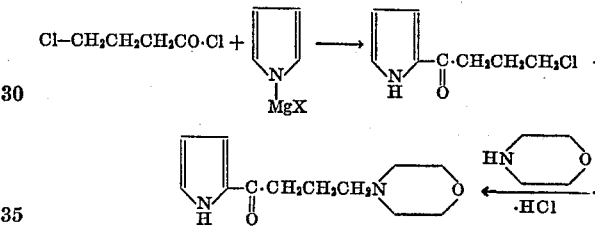

When β-halopropionyl halides are used in the process above, compounds are obtained in which $n$ is 2.

An alternate process for the preparation of compounds in which $n$ is 2 may be used when one starts with certain trisubstituted pyrroles. This is exemplified in the following sequence which employs a Mannich reaction in the final step.

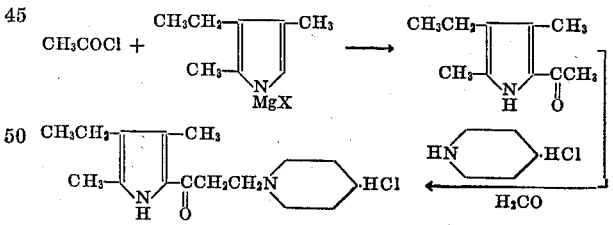

It was discovered that the compounds of this invention in which $n$ of Formula A is 2 or 3 possess superior activity in comparision with corresponding compounds in which $n$ is 1. In general the former are several times as active but no more toxic than the latter. This is illustrated in Table I which compares the oral toxicity (expressed as the dose at which half the animals survive) with sedative efficacy (expressed as the oral dose required to reduce Spontaneous Locomotor Activity by 50%) for three groups of compounds.

TABLE I.—DATA OBTAINED UPON ORAL ADMINISTRATION TO MICE

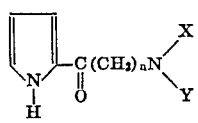

| $\begin{matrix}X\\N\\Y\end{matrix}$ | n | LD$_{50}$, mg./kg. | SLA$_{50}$, mg./kg. |
|---|---|---|---|
| Piperidyl | 1 | 60 | 20.0 |
| Do | 2 | 55 | 1.5 |
| Do | 3 | 165 | 4.6 |
| Morpholinyl | 1 | 1,000 | 92.0 |
| Do | 2 | 1,000 | 1.0 |
| Do | 3 | 750 | 4.7 |
| 4-phenylpiperazinyl | 1 | 750 | 49.0 |
| Do | 2 | 200 | 8.8 |
| Do | 3 | 600 | 3.0 |

For therapeutic use, the aminoalkyl compounds of this invention may be formulated with conventional pharmaceutical carriers to form tablets, capsules, elixirs, solutions, suspensions, suppositories and the like.

The foregoing descriptions and the following examples are exemplary of the scope and procedures of this invention. Other obvious equivalents to the structures detailed herein will be apparent to one skilled in the art and are, accordingly, included in this invention. Weights and measurements are stated in metric system values. Temperatures are in degrees centigrade.

The following are examples in accordance with this invention.

Example 1.—2-chloroethyl pyrrol-2-yl ketone

To a Grignard solution prepared from 28.0 g. of magnesium, 119.9 g. of ethyl bromide and 280 ml. of ether was added 67.1 g. of pyrrole. A second dark liquid layer formed. To the resulting mixture was added 149.5 g. of 3-chloropropionyl chloride. Ten minutes after the addition was completed, the reaction was treated with water and then extracted with ether. The ethereal solution was washed with aqueous sodium carbonate, dried and concentrated to yield the product, M.P. 84–86°, when recrystallized from hexane.

Example 2.—2-piperidinoethyl pyrrol-2-yl ketone hydrochloride

A 3.9 g. sample of 2-chloroethyl pyrrol-2-yl ketone was dissolved in 25 ml. of a solution of 50% piperidine in ethanol and the resulting solution was heated under reflux for two hours on a steam bath. Excess solvent was removed under reduced pressure and the resulting oil was partitioned between ether and water. The ethereal layer was dried and treated with hydrogen chloride. The hydrochloride that separated was recrystallized from ethanol; M.P. 213–214°.

Example 3.—2-(4-phenylpiperazino)ethyl pyrrol-2-yl ketone

A 10.0 g. sample of 2-chloroethyl pyrrol-2-yl ketone was mixed with an acetone solution of 20.6 g. of N-phenylpiperazine. Thereupon, the resulting solution became warm and N-phenylpiperazine hydrochloride separated from solution. After an hour of standing, the mixture was heated under reflux for an additional hour, cooled, filtered and concentrated. The residual base crystallized and, upon recrystallization from ether and hexane, melted at 108–109°.

Example 4.—2-morpholinoethyl pyrrol-2-yl ketone hydrochloride

The product was obtained by the method of Example 2 and melted at 206–207° after recrystallization from ethanol.

Example 5.—2-cyclohexylaminoethyl pyrrol-2-yl ketone

The product was obtained by the method of Example 2 and melted at 213–214° after recrystallization from ethanol.

Example 6.—3-chloropropyl pyrrol-2-yl ketone

To a Grignard solution prepared from 26.7 g. of magnesium, 119.9 g. of ethyl bromide and 270 ml. of ether was added 67.1 g. of pyrrole. A second dark liquid layer formed. To the resulting mixture was added 155.1 g. of 4-chlorobutyryl chloride. One hour after the addition was completed, the reaction mixture was treated with 25% NH$_4$Cl solution and then extracted with ether. The ethereal solution was washed with aqueous sodium carbonate, dried and concentrated to yield the product, M.P. 69–71°, recrystallized from cyclohexane.

Example 7.—3-piperidinopropyl pyrrol-2-yl ketone hydrochloride

An 8.5 g. sample of 3-chloropropyl pyrrol-2-yl ketone was dissolved in 50 ml. of 50% ethanolic piperidine and the resulting solution was heated under reflux for two hours. Excess solvent was removed under reduced pressure and the viscous residue was partitioned between ether and water. The ether layer was again evaporated to dryness under reduced pressure and the residue was taken up in anhydrous ether and treated with a stream of hydrogen chloride. The hydrochloride thus obtained was recrystallized from isopropanol; M.P. 174–175°.

Example 8.—3-morpholinopropyl pyrrol-2-yl ketone hydrochloride

A 10.0 g. sample of 3-chloropropyl pyrrol-2-yl ketone was dissolved in excess morpholine and the resulting solution was allowed to stand for 16 hours. Morpholine hydrochloride precipitated upon addition of ether and was removed by filtration. The filtrate was evaporated to dryness and the residual oil was partitioned between ether and water. The ethereal layer was dried and treated with hydrogen chloride. The precipitated product was recrystallized from isopropanol; M.P. 188–189°.

Example 9.—3-(4-phenylpiperazino) propyl pyrrol-2-yl ketone

By the method of Example 8, using 1-phenylpiperazine in place of morpholine, the product was obtained and crystallized from aqueous methanol as the free base, M.P. 105–106°.

Example 10.—3-dimethylaminopropyl pyrrol-2-yl ketone hydrobromide

By the method of Example 7, using ethanolic dimethylamine and hydrogen bromide in the process, the product was obtained and purified by recrystallization from ethanol.

Example 11.—3-[4-(4'-chlorophenyl)-4-hydroxy] piperidinopropyl pyrrol-2-yl ketone A mixture of 5.0 g. of 3-chloropropyl pyrrol-2-yl ketone, 4.9 g. of 4-(4'-chlorophenyl)-4-hydroxypiperidine, 6.5 g. of sodium carbonate, 0.1 g. of potassium iodide and 175 ml. of toluene was heated under reflux for 48 hours. The mixture was filtered and the filtrate was evaporated to dryness. The residual product, upon recrystallization from methanol, melted at 168–169°.

Example 12.—3-chloropropyl 1-methylpyrrol-2-yl ketone

By the method of Example 6, using 1-methylpyrrole in place of pyrrole, the product was obtained and distilled at 132–141°/1.5 mm.

Example 13.—1-methylpyrrol-2-yl 3-(4-phenylpiperazino)propyl ketone hydrochloride The product was obtained from 22 g. of 3-chloropropyl 1-methylpyrrol-2-yl ketone, 39 g. of 1-phenylpiperazine and 50 ml. of acetone by the method of Example 3. The hydrochloride was crystallized from isopropanol; M.P. 161–163°.

Example 14.—2-chloroethyl 3,5-dimethyl-pyrrol-2-yl ketone

This compound was prepared by the method of Example 1 using 2,4-dimethylpyrrole in place of pyrrole. After recrystallization from methanol the compound melted at 159° (decomposition).

Example 15.—2-morpholinoethyl 3,5-dimethyl-pyrrol-2-yl ketone

This compound was obtained by the method of Example 8 using 2-chloroethyl 3,5-dimethylpyrrol-2-yl ketone in place of 3-chloropropylpyrrol-2-yl ketone; M.P., upon recrystallization from cyclohexane, 145–146°.

Example 16.—3,5-dimethyl-4-ethylpyrrol-2-yl 2-piperidinoethyl ketone

A mixture of 10.1 g. of 3,5-dimethyl-4-ethylpyrrol-2-yl methyl ketone, 7.5 g. of piperidine hydrochloride, 1.8 g. of paraformaldehyde and 200 ml. of ethanol was heated under reflux in an atmosphere of nitrogen for 24 hours. Another 0.6 g. of paraformaldehyde was added and refluxing was continued for an additional 24 hours. Solvent was removed and the residue was diluted with water and hydrochloric acid. The resulting solution was extracted with ether to remove traces of non-basic material and then made strongly basic with ammonia. The product separated and crystallized. It was recrystallized first from hexane and then from aqueous methanol; M.P. 114.5–115°.

The active aminoalkyl compounds of this invention may be administered in the form of tablets or capsules in doses of 10–200 mg., in syrup at 2–20 mg./ml. concentration, in 10–200 mg. suppositories or by parenteral injection in 10–50 mg./ml. concentration.

The following examples are illustrative.

Example 17

Ingredients: Mg.
2-morpholinoethyl pyrrol-2-yl ketone hydrochloride _____ 25
Magnesium stearate _____ 1
Lactose _____ 100
Cab-O-Sil (amorphous silicon dioxide) _____ 5

These ingredients were combined, blended and passed through a No. 1 screen of a Fitzpatrick comminutor machine before encapsulating into a two-piece hard gelatin No. 3 capsule on a standard capsulating machine at a net weight of 126 mg.

Example 18

Ingredients: Mg./ml.
3-piperidinopropyl pyrrol-2-yl ketone hydrochloride _____ 50
Sodium chloride _____ (1)
Methylparaben USP _____ 1.8
Propylparaben USP _____ 0.2
Water _____ Q.s.

[1] Q.s. for isotonicity.

The above ingredients are combined in sterile solution for parenteral use.

It will be understood that the foregoing description of the invention and the examples set forth are merely illustrative of the principles thereof. Accordingly, the appended claims are to be construed as defining the invention within the full spirit and scope thereof.

I claim:
1. A compound selected from the group of ketones of the following Formula A and the pharmaceutically acceptable acid addition salts thereof

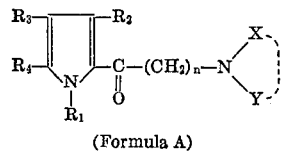

(Formula A)

wherein $R_1$ is hydrogen, lower alkyl having a maximum of 4 carbon atoms or benzyl $R_2$, $R_3$ and $R_4$ are hydrogen, alkyl, alkenyl or cycloalkyl having a maximum of 8 carbon atoms, phenyl or benzyl;

$n$ is 2 or 3;

X and Y are hydrogen, lower alkyl, hydroxy-lower alkyl, lower alkanoyloxy lower alkyl, carbamyloxy-lower alkyl, phenyl lower alkyl, cyclohexyl, or

is piperidino, (lower alkyl) piperidino, di(lower alkyl)piperidino, (lower alkoxy)piperidino, hydroxypiperidino, phenyl hydroxypiperidino, (lower alkanoyloxy) piperidino, pyrrolidino, (lower alkoxy) pyrrolidino, hydroxypyrrolidino, morpholino, (lower alkyl) morpholino, thiamorpholino, (lower alkyl) dimorpholino, di(lower alkyl) hydroxyloweralkylpiperazino, lower alkanoyloxy-lower alkyl piperazino, and carbamyl-lower alkyl piperazino, wherein "lower alkanoyl," "lower alkyl" and "lower alkoxy" have both straight and branched chains having a maximum of 5 carbon atoms.

2. A 2-(heterocycloamino) ethylpyrrol-2-yl ketone of claim 1 wherein "heterocycloamino" is the grouping

of claim 1.

3. A 3-(heterocycloamino) propylpyrrol-2-yl ketone of claim 1 wherein "heterocycloamino" is the grouping

of claim 1.

4. Lower alkylaminoethylpyrrol-2-yl ketone of claim 1.
5. Lower alkylaminopropylpyrrol-2-yl ketone of claim 1.
6. 2-morpholinoethyl pyrrol-2-yl ketone being a compound of claim 1.
7. 3-morpholinopropyl pyrrol-2-yl ketone, being a compound of claim 1.
8. 2 - (4 - phenylpiperazino)ethyl pyrrol-2-yl ketone, being a compound of claim 1.
9. 3-dimethylaminopropyl pyrrol-2-yl ketone, being a compound of claim 1.
10. 1-methylpyrrol-2-yl 3-(4-phenylpiperazino) propyl ketone, being a compound of claim 1.

No references cited.

NICHOLAS S. RIZZO, Primary Examiner.

JOSE TOVAR, Assistant Examiner.

UNITED STATES PATENT OFFICE
CERTIFICATE OF CORRECTION

Patent No. 3,407,199          Dated October 22, 1968

Inventor(s) Irwin J. Pachter

It is certified that error appears in the above-identified patent and that said Letters Patent are hereby corrected as shown below:

Column 1, line 45, after "n is 2 or 3;", read: -- X and Y designate: hydrogen, lower alkyl, hydroxy-lower alkyl, lower acyloxyalkyl, carbamyloxy-lower alkyl, phenyl lower alkyl, cycloalkyl. --. Column 6, line 34, for "carbamyl", read: -- carbamyloxy --.

Signed and Sealed

NOV 3 1970

(SEAL)
Attest:

Edward M. Fletcher, Jr.
Attesting Officer

WILLIAM E. SCHUYLER, JR.
Commissioner of Patents